(12) United States Patent
Tanoury et al.

(10) Patent No.: US 9,771,694 B2
(45) Date of Patent: Sep. 26, 2017

(54) SAFETY CONE WITH CONTROLLED ILLUMINATION

(71) Applicants: Peter Tanoury, Newport Beach, CA (US); Peter Engler, Corona Del Mar, CA (US)

(72) Inventors: Peter Tanoury, Newport Beach, CA (US); Peter Engler, Corona Del Mar, CA (US)

(*) Notice: Subject to any disclaimer, the term of this patent is extended or adjusted under 35 U.S.C. 154(b) by 130 days.

(21) Appl. No.: 14/994,022

(22) Filed: Jan. 12, 2016

(65) Prior Publication Data

US 2017/0198447 A1 Jul. 13, 2017

(51) Int. Cl.
| | |
|---|---|
| *F21L 4/00* | (2006.01) |
| *E01F 9/016* | (2006.01) |
| *E01F 9/012* | (2006.01) |
| *H05B 33/08* | (2006.01) |

(52) U.S. Cl.
CPC ............ *E01F 9/016* (2013.01); *E01F 9/0122* (2013.01); *H05B 33/0857* (2013.01)

(58) Field of Classification Search
CPC .................................. E01F 9/688; E01F 9/016
See application file for complete search history.

(56) References Cited

U.S. PATENT DOCUMENTS

| | | | | |
|---|---|---|---|---|
| 2,949,531 A | * | 8/1960 | Lemelson | F21V 33/00 340/908.1 |
| 7,951,045 B1 | * | 5/2011 | Brader | A63B 24/0062 434/247 |
| 2009/0195412 A1 | * | 8/2009 | Chen | E01F 9/688 340/908 |
| 2010/0265699 A1 | * | 10/2010 | Nielson | E01F 9/688 362/158 |
| 2014/0104833 A1 | * | 4/2014 | Alsaffar | E01F 9/688 362/249.01 |
| 2014/0120798 A1 | * | 5/2014 | Finn | A63H 33/086 446/125 |

* cited by examiner

*Primary Examiner* — Evan Dzierzynski (57) ABSTRACT

A safety or sports cone with controlled illumination is provided that is durable and easy to use. The cone has a light-transmitting body with an illumination device housing integrated into the top of the body that houses an illumination device that rests on a support ring and is accessed by a housing cap. The illumination device includes a light-emitting diode (LED) module, an LED actuator, a battery, and a battery housing. The illumination device is covered by a protective transparent shell. A reflective platform increases the illumination intensity at the top of the cone and provides additional protection from physical damage and contaminants. The illumination is activated and deactivated by pressing the center of the housing cap to affect the LED actuator. One or more ridges extending from the inner surface of the body below the support ring prevent unwanted activation of the illumination device during cone stacking.

19 Claims, 11 Drawing Sheets

SAFETY CONE WITH CONTROLLED ILLUMINATION

FIELD OF THE INVENTION

The present invention relates to safety or sports cones.

BACKGROUND OF THE INVENTION

Plastic or rubber cones of various sizes are commonly used to set boundaries and designate dangerous or sensitive areas. For example, traffic or safety cones are used in traffic, construction, and accident settings to halt or direct traffic and passers-by. In sports, a smaller and lighter version of these cones is used to designate various boundaries such as the corners, and other portions of a playing field, including goal areas. Safety and sports cones are used during the day as well as nighttime, and visibility is a critical aspect of the cone. As a result, safety and sport cones are often given a highly noticeable, distinctive color such as bright orange or green. Moreover, some cones include a reflective material to be more visible when light is shined on them. However, in low-light conditions where the observer does not have the benefit of a directional light source (e.g. vehicle's headlights) to illuminate the cone, such as in nighttime sports activities, conventional cones may be difficult to see. It is desirable to have a cone that is highly and efficiently visible in low-light or no-light conditions.

SUMMARY OF THE INVENTION

A safety or sports cone with controlled illumination is provided that is durable and easy to use. The cone has a light-transmitting body with an illumination device housing integrated into the top of the body. The illumination device housing contains a support ring upon which the illumination device rests, and a housing cap that provides access to the illumination device. The illumination device includes a light-emitting diode (LED) module, an LED actuator, a battery, and a battery housing. The illumination device fits within, and it protected by, a transparent shell. A reflective platform increases the illumination intensity at the top of the cone and provides additional protection from physical damage and contaminants. The illumination is activated and deactivated by pressing the center of the housing cap that causes contact with the LED actuator. One or more ridges extending from the inner surface of the body below the support ring prevent unwanted activation of the illumination device when cones are stacked on top of each other.

DETAILED DESCRIPTION

In the following discussion, numerous specific details are set forth to provide a thorough understanding of the present invention. However, those skilled in the art will appreciate that the present invention may be practiced without such specific details. In other instances, well-known elements, processes or techniques have been briefly mentioned and not elaborated on in order not to obscure the present invention in unnecessary detail and description. Moreover, specific details and the like may have been omitted inasmuch as such details are not deemed necessary to obtain a complete understanding of the invention, and are considered to be within the understanding of persons having ordinary skill in the relevant art.

Figure 1:
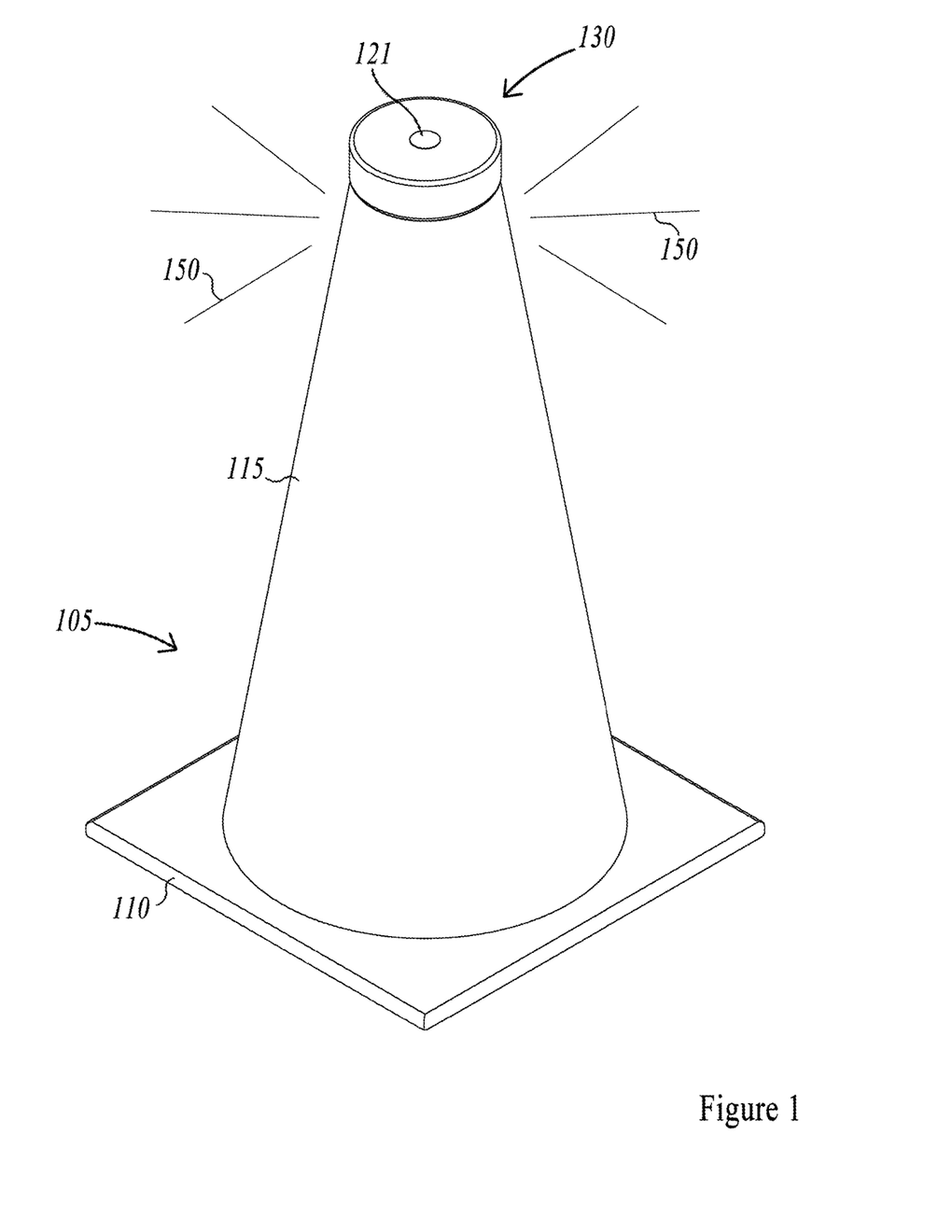
FIG. 1 illustrates an isometric view of the illuminated cone with installed housing cap.

FIG. 1 illustrates an isometric view of the illuminated cone with installed housing cap as fully assembled and ready for use. The device of the present invention comprises a modified self-standing cone 105 with base portion 110 and cone portion 115. The terminal end of the cone portion 115, opposite the base portion 110, is temporarily sealed with a screw-on housing cap 130 with a pressable center portion 121. LED lighting components housed within the cone 105 (see illumination device 220 of FIG. 2) result in an illuminated area of the cone, shown by illumination lines 150, which emanate away from this area. The placement and symmetric configuration of the interior lighting components are such that the stability and aesthetics of the cone 105 are not adversely affected. In other words, the size and shape of the cone are not altered by the illumination hardware. FIG. 1 shows the housing cap 130 in a closed state, covering the interior lighting components. This provides a closed-off, self-contained structure with electronic components that are substantially immune to damaging external elements (e.g. air, water, dirt).

An LED module (see LED module 228 of FIG. 2) housed within the cone portion 105 is composed of a transparent, polymeric material that allows light to effectively emanate from the LED and beyond the cone's exterior. When the LED is activated, a circumferential area of the cone portion directly beneath the housing cap 130 becomes illuminated. Said illumination makes the present invention suitable for night usage. As such, it is ideal for usage in both recreational and safety situations. Examples of nighttime usage may be driving education, outdoor games, cautionary street lighting for construction and the like, zone marking, etc. Preparing an illuminated cone for any such usage requires only the twist of a cap (if needed), and the click of a button. The LED light is activated and deactivated by pressing the housing cap 130 downward at its pressable center portion 121 (see FIG. 2). Successive clicks or pressings cycle the unit through one or more "ON" and "OFF" states. For example, pressing the center portion 121 three times successively (starting in the OFF state) will result in the following operational sequence: LED ON, BLINKING LED, LED OFF. Alternatively, this and other lighting operations can be affected by a single pressing of the housing cap pursuant to the programming of the LED circuit board. For example, the illumination device's circuit board can be programmed such that a single press of the housing cap results in an alternating LED OFF/LED ON state, LED OFF/BLINKING LED state, or LED ON/BLINKING LED state. With the use of a Red-Green-Blue (RGB) LED, a variety of colors can be created by the LED module, other than red, green and blue (e.g., yellow, cyan, magenta, purple). Alternative colors or lighting sequences could be utilized while keeping within the scope and spirit of the invention.

Figure 2:
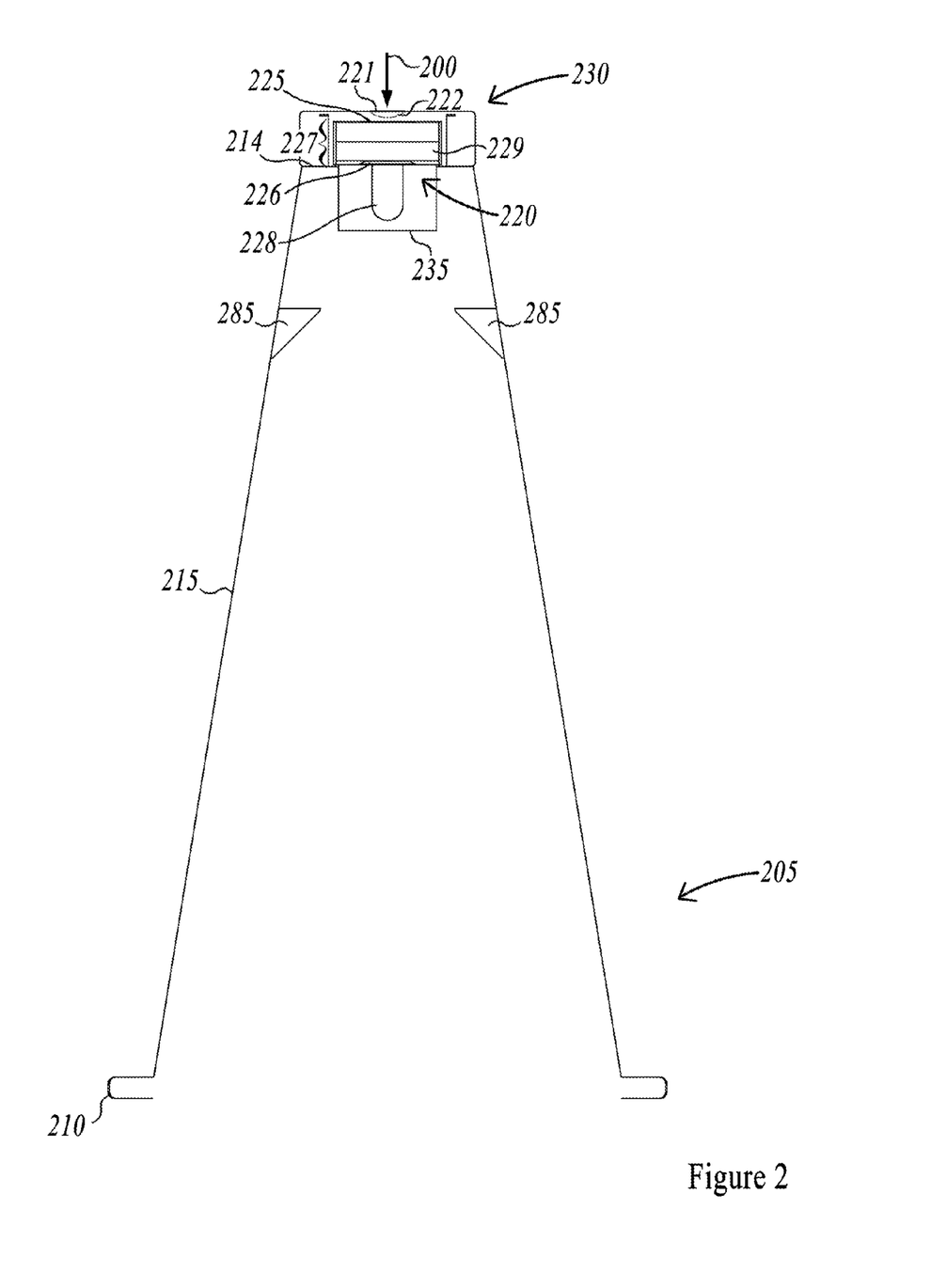
FIG. 2 illustrates a cross-sectional side view of the illuminated cone with sealed illumination device.

FIG. 2 illustrates a cross-sectional side view of the illuminated cone with sealed illumination device. It comprises a modified self-standing cone 205, an illumination device 220, a transparent shell 235, and a housing cap 230. The modified self-standing cone 205, with base portion 210 and cone portion 215 securely houses the illumination device 220 and transparent shell 235. The transparent shell 235 is made of a thin, clear plastic and is shaped to house the illumination device and keep it in place within the illumination housing within the top of the cone. The transparent shell 235 protects the illumination device from moisture, contaminants, and physical damage without diminishing the light from the LED module 228. The illumination device 220 comprises a battery housing 227 and LED module 228. The illumination device 220 rests on the support ring 214, which acts as a platform to secure the illumination device and provides an opening for the LED module 228 to extend downward. The battery housing 227 further comprises a protrusion contact plate 225, an LED control contact 226, and one or more removable batteries 229. The removable batteries 229 may be chemical cell batteries as are conventionally used in small electronic devices. Compressing these three components together in succession activates the LED light within the module 228. In this figure, the housing cap 230 is twisted onto the cone portion 215, thereby sealing interior components. At the center of the housing cap 230 is a pressable center portion 221. Applying pressure to center portion 221 in the direction of the cone causes the depression of the center portion and the underlying protrusion 222 on the housing cap 230. This action activates and deactivates the operation of the LED within the LED module 228 of the illumination device 220.

In order to activate the illumination device 220, a user exerts a downward force upon the pressable center portion 221 of the housing cap 230, indicated by motion arrow 200. This physically compresses the protrusion contact plate 225 onto the batteries 229. This in turn depresses the LED control contact 226 which is attached to the top surface of the LED circuit board (see LED circuit board 624 of FIG. 6), transmitting a signal directly to the LED module 228, including the activation state (i.e., ON/OFF) and lighting duration/timing. Depending on the operation sequence, this pressing of the pressable center portion 221 will turn on the LED, switch to a blinking LED state, or turn off the LED. These and other parameters are controlled by the program set by the LED circuit board, subject to the manual activation/deactivation of the lighting by pressing the housing cap. As shown, ridges 285 extend from the inner surface of the cone body below the support ring 214. The ridges 285 could be a continuous element or a plurality of discrete elements extending from the inner surface of the cone. The ridges 285 prevent unwanted activation of the LED module by depression of the housing cap 230 when additional cones are stacked on top of the cone. Thus, the illuminated cone of the present invention are no external switch mechanisms or protruding buttons of any kind that could be subject to breaking from physical impact or damage due to contaminants such as moisture, dirt and other debris. This is highly advantageous given the nature of use for sports and safety cones that are exposed to a variety of environmental elements and are routinely subject to physical impacts and wear. Similarly, the illumination device is completely contained within the cone and is thus protected from harmful environmental elements and damaging physical contact that can reduce the life of the device or cause catastrophic failure. Further, the design of the present invention provides an illuminated cone that does not alter the shape or usage of the cone to accommodate the illumination aspects.

Figure 3:
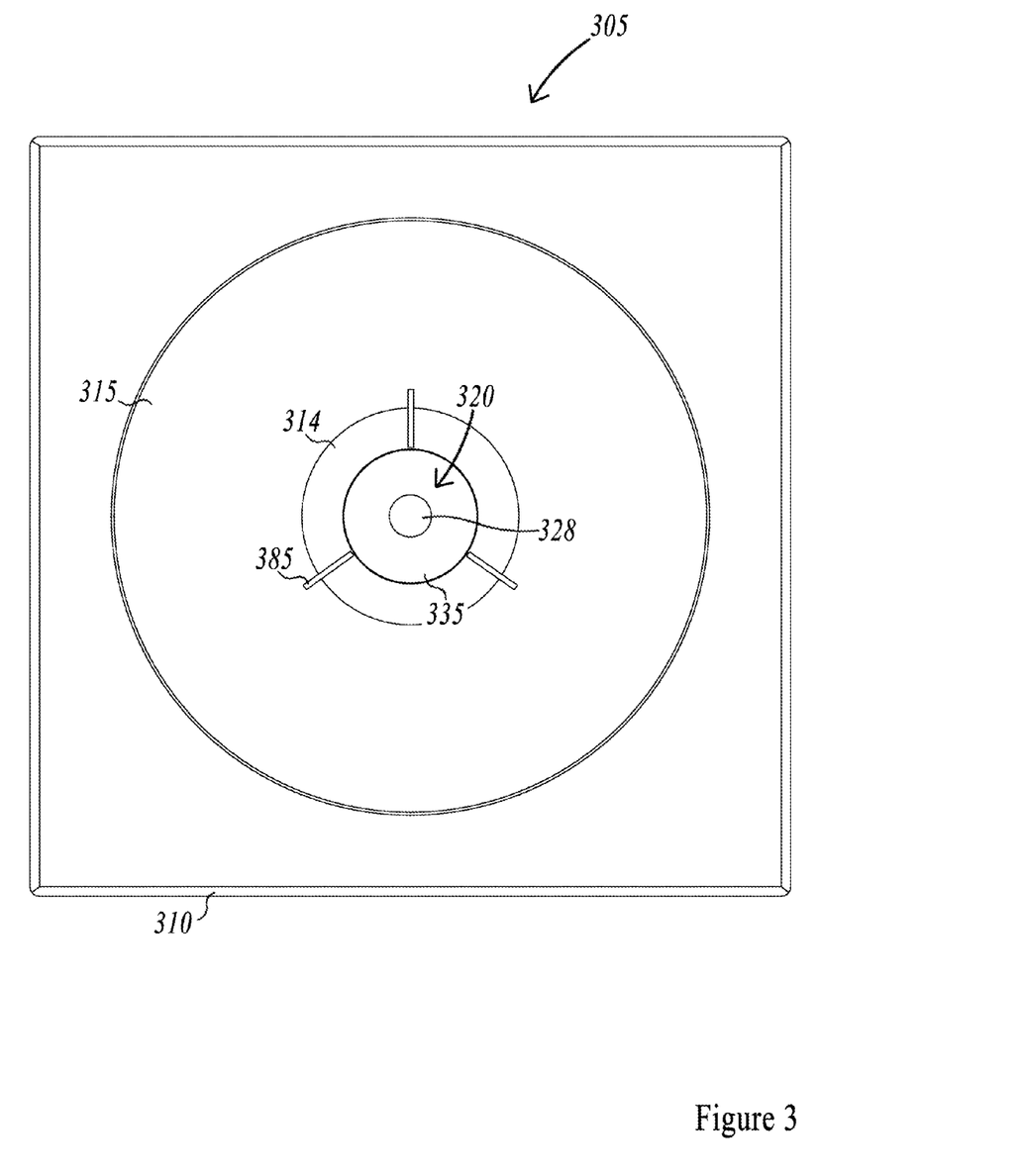
FIG. 3 illustrates a bottom view of the illuminated cone and its interior.

FIG. 3 illustrates a bottom view of the illuminated cone and its interior. The modified self-standing cone 305 comprises a square base portion 310, a curved cone portion 315, and an extended support ring 314. In this figure, the center area of the cone portion 315 shows elements at or near the top of the cone (the terminal end opposite the base portion 310). These elements include the transparent shell 335 and the illumination device 320 with LED module 328. The transparent shell 335 is held in place by the cone's extended support ring 314, sitting directly upon it. As shown, the ridges 385 extend from the inner surface of the cone body below the support ring. The ridges 385 could be a continuous element or a plurality of discrete elements (as shown in FIG. 3) extending from the inner surface of the cone. The ridges 385 prevent unwanted activation of the LED module by depression of the housing cap when additional cones are stacked on top of the cone. The illumination device 320 is visible in this view due to the transparent shell's high level of transparency. This bottom view also shows how the LED module 328 lies directly in the center of the cone portion 315, in line with its vertical axis. This provides for even lighting that is emitted from the interior of the cone and is easily viewable from its exterior surface.

Figure 4:
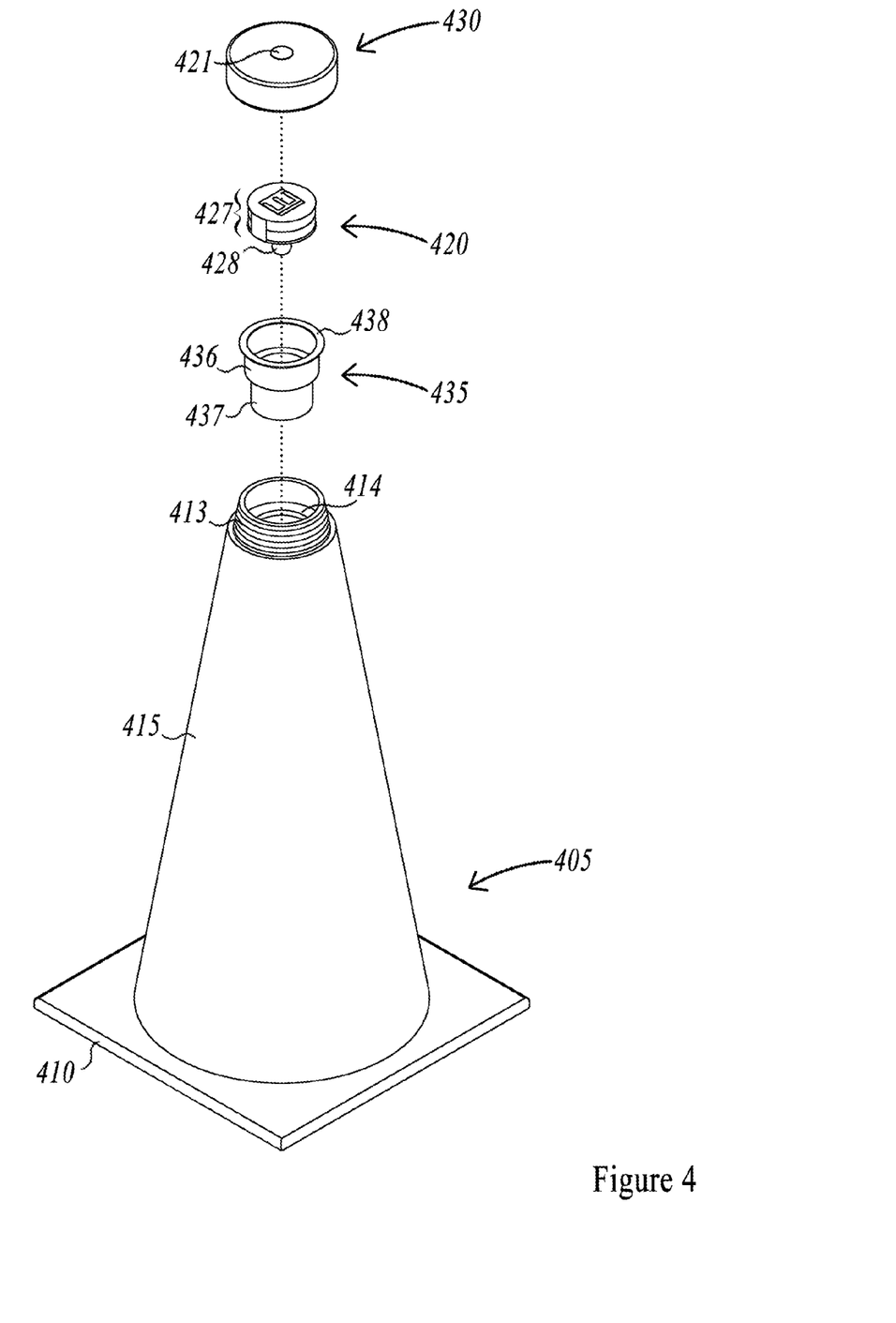
FIG. 4 illustrates an isometric exploded view of the illuminated cone.

FIG. 4 illustrates an isometric exploded view of the illuminated cone. The illuminated cone comprises a modified self-standing cone 405, transparent shell 435, illumination device 420 and housing cap 430. The modified self-standing cone 405 comprises a base portion 410, cone portion 415, threaded top portion 413, and extended support ring 414. It provides a structural foundation and protective shell for all interior components. Additionally, its composition and color can substantially affect the characteristics of light emission. Placed directly into the cone's threaded top portion 413, the transparent shell 435 comprises a rim portion 438, upper tier 436 and lower tier 437. It fits snugly within the cone, snapping or maintaining its position via substantial friction. The illumination device 420, with battery housing 427 and LED module 428, is placed directly into the transparent shell 435, and fits snugly therein. The transparency of the transparent shell 435 allows for the passage of light emitted from the LED module 428 through the structure. The housing cap 430, with pressable center portion 421, is twisted onto the cone's threaded top portion 413. This fully installs the unit and protectively encloses all vital electronic components. Thus, as described, the present invention provides a safety cone with an integrated, controllable illumination. The illumination device is easily accessible by removal of the housing cap, such that the batteries can be replaced as needed.

Figure 5:
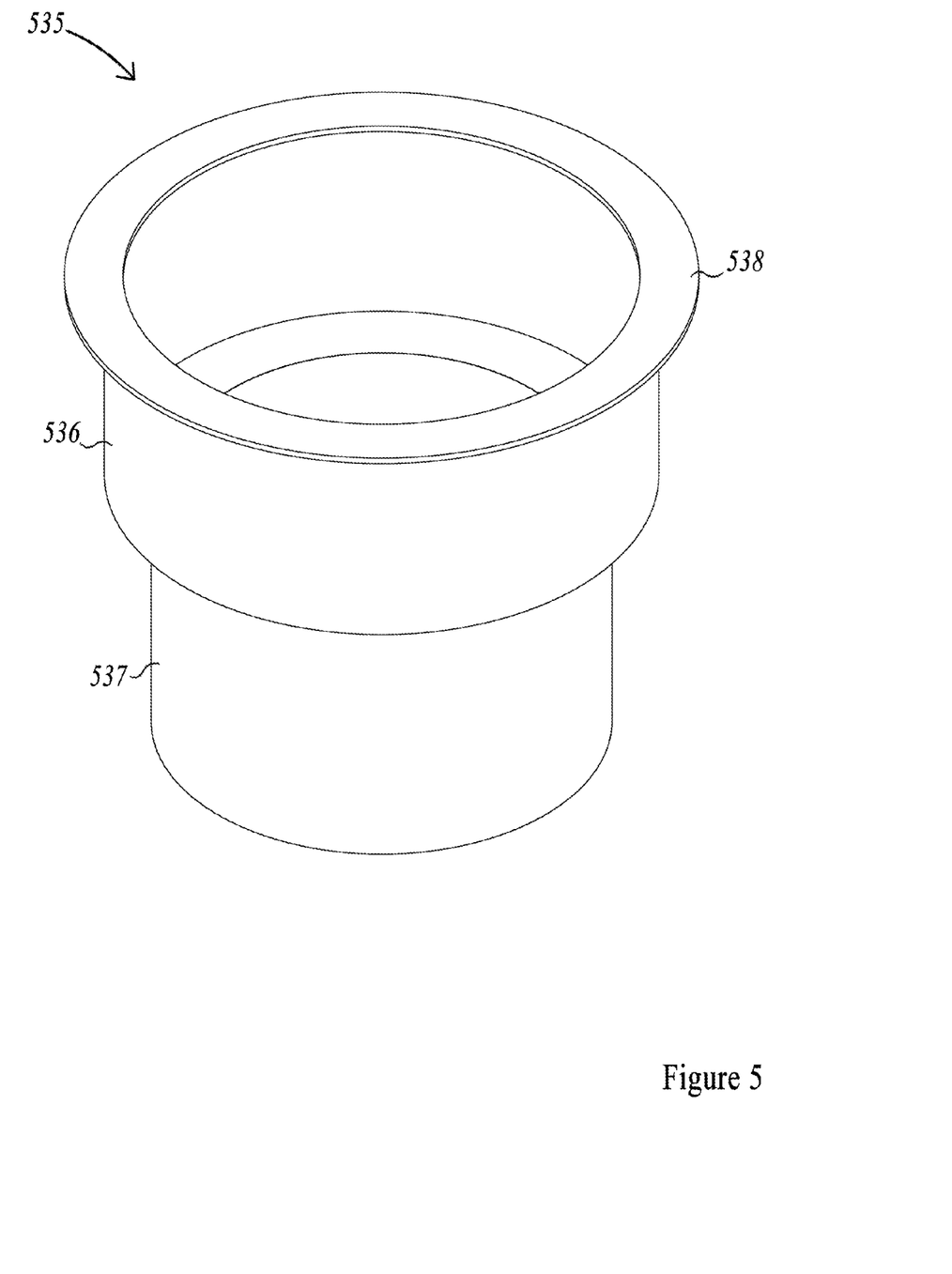
FIG. 5 illustrates a close-up perspective side view of the transparent shell.

FIG. 5 illustrates a close-up perspective side view of the transparent shell. The transparent shell 535 provides both stabilization of the illumination device and protection for its electronic components from outside elements. It comprises a rim portion 538 at its open top end, an upper tier 536 and a lower tier 537. The transparent structure is composed of plastic or similar semi-rigid polymer. Placed into the top of the cone (see threaded top portion 413 of FIG. 4), the transparent shell fits snugly into the cone via its form-fitting contours. Its lower tier 537 sits beneath the extended support ring of the cone (see extended support ring 214 of FIG. 2) and houses the LED module of the illumination device (see LED module 228 of FIG. 2). Its upper tier 536 sits above the extended support ring of the cone, nearly flush with the installed housing cap (see housing cap 230 of FIG. 2). The rim portion 538 provides a stopping point during transparent shell installation; exerting a downward force on it can help to fully insert the structure into the cone. The bottom surface of the lower tier 537 is closed off, thereby fully enclosing the illumination device housed within the structure 535. This prevents dirt, debris, moisture, etc., that may enter through the bottom of the cone, from making contact with any components in the illumination device. The combination of housing cap and closed-off transparent shell thus creates a substantially impenetrable buffer between the illumination device and external elements.

Figure 6:
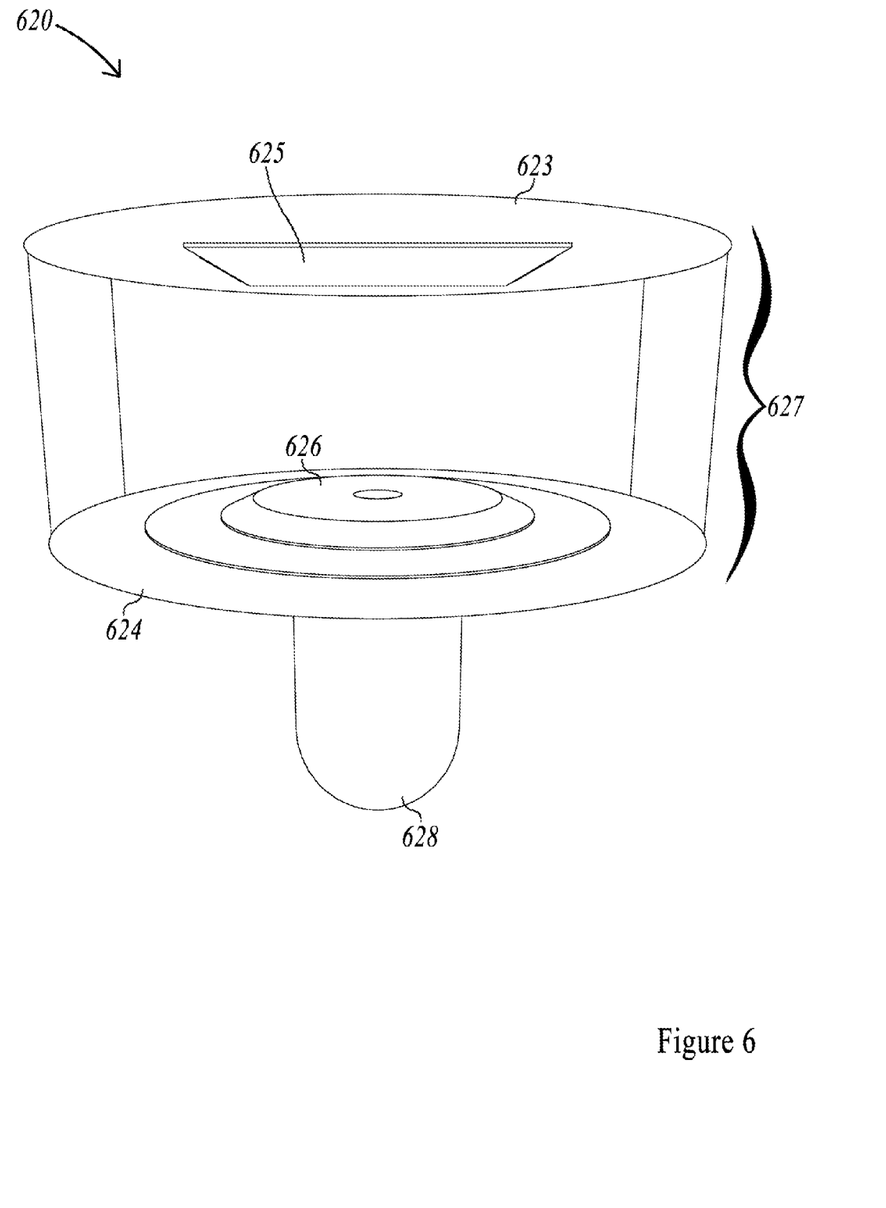
FIG. 6 illustrates a close-up perspective side view of the illumination device with batteries uninstalled.

FIG. 6 illustrates a close-up perspective side view of the illumination device with batteries uninstalled. The illumination device 620 comprises a battery housing 627 and an LED module 628. The battery housing 627 further comprises a top portion 623 with protrusion contact plate 625 and an LED circuit board 624 with LED control contact 626. The protrusion contact plate 625 allows the transfer of force from the protrusion of the housing cap to the batteries (not shown), which in turn exert a downward force onto the LED control contact 626. The LED control contact then triggers a circuit completion response within the LED circuit board 624 that causes LED light activation/deactivation. The LED control contact 626 extends a small distance above the LED circuit board 624, and can only be compressed downward with a sufficient force applied by a user to the cap. The weight of the batteries alone is not substantial enough to cause said compression.

Figure 7:
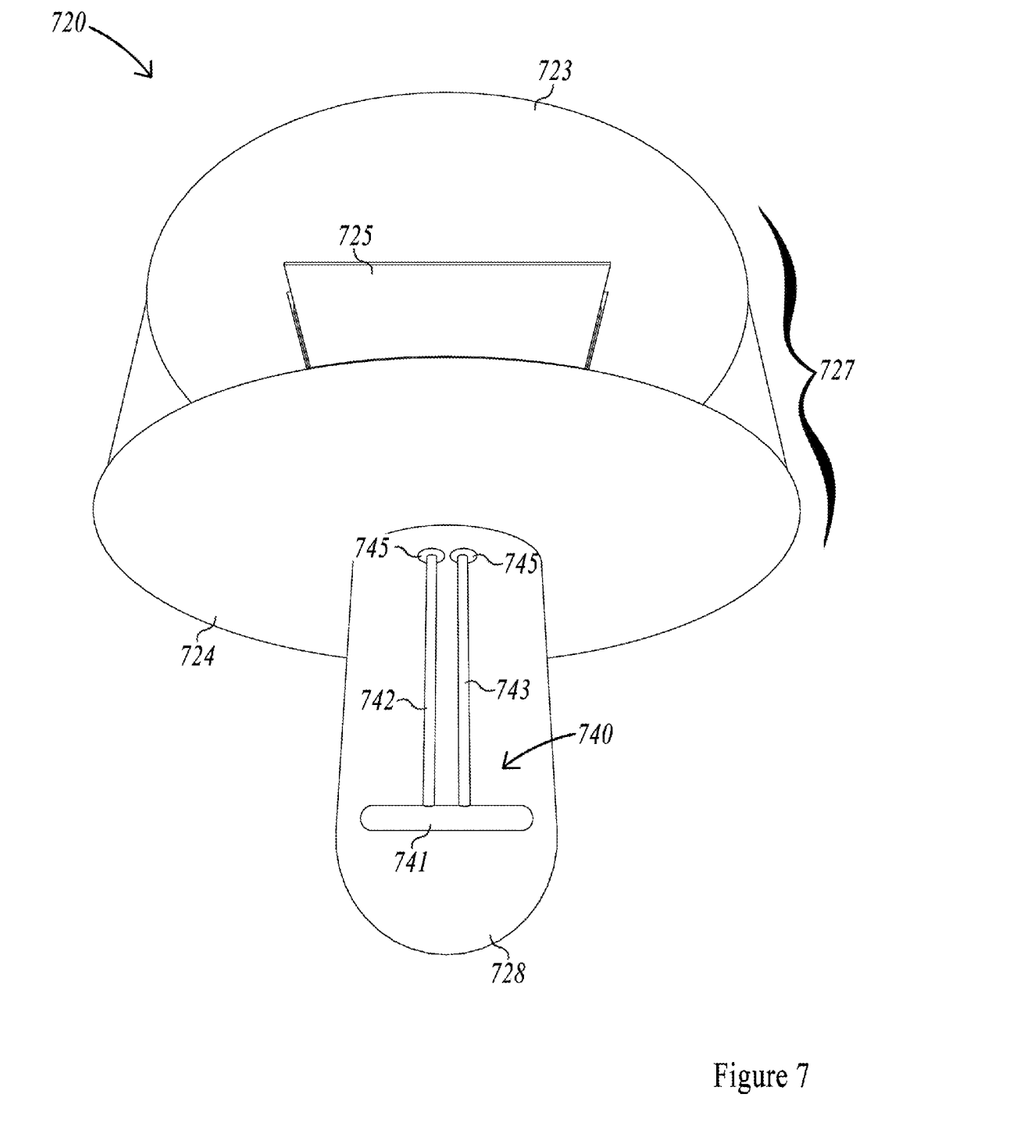
FIG. 7 illustrates a close-up perspective bottom view of the illumination device with transparent LED module and LED components housed within.

FIG. 7 illustrates a close-up perspective bottom view of the illumination device with transparent LED module and LED components housed within. The illumination device 720 comprises a battery housing 727 and LED module 728. The battery housing 727 further comprises a top portion 723 with protrusion contact plate 725, and an LED circuit board 724 from which the LED module 728 extends. This detail of the LED module shows the interior light-emitting diode 740 housed within the module. The diode comprises two electrodes 742-743 which are standard cathode/anode components. The electrodes terminate in a lead frame 741 which outputs light via a P-N junction as known in the art. The terminal ends of the electrodes 742-743 (opposite the terminal end that is the lead frame 741) make contact with the LED circuit board 724 through its bottom surface, via solders 745, for a permanent connection that carries signal current to the diode 740. Signals from the LED circuitry (i.e. LED circuit board 724) control the sequence and pattern of operation of the LED light via methods known in the art. For example, successive pressings of the center portion of the housing cap (see housing cap 130 and center portion 121 of FIG. 1) can cause the LED 740 to cycle through the following operation sequence: ON, INTERMITTENT BLINKING, OFF.

Figure 8:
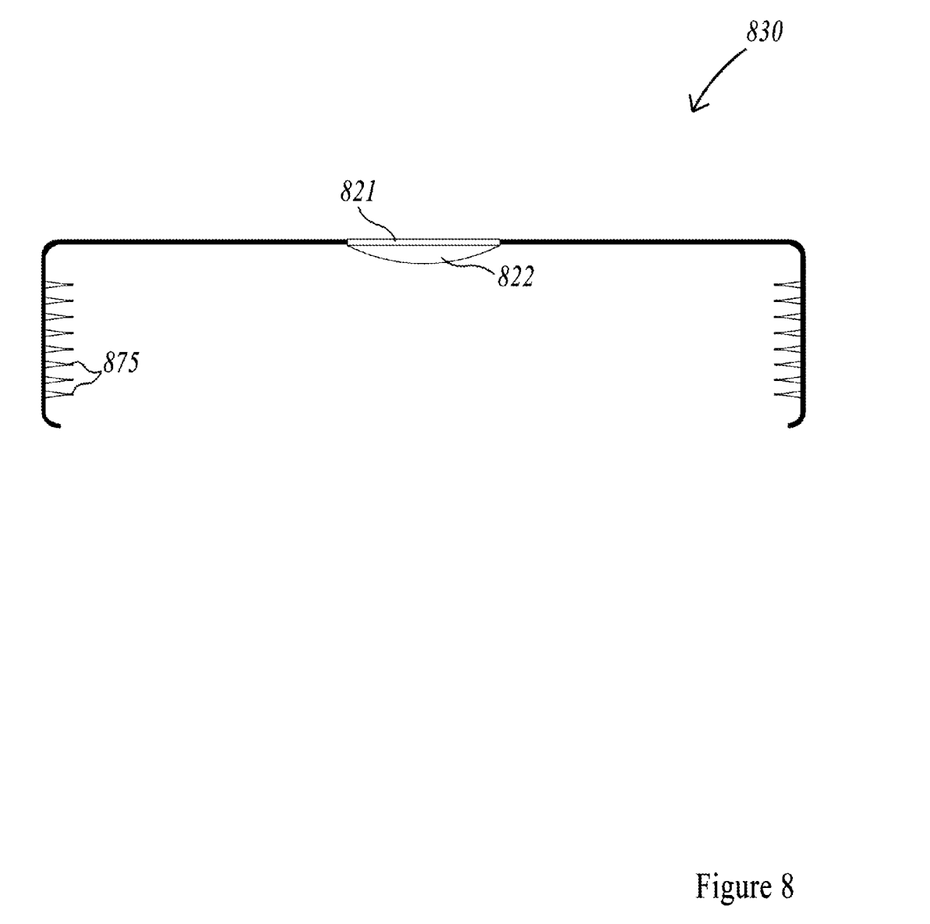
FIG. 8 illustrates a close-up cross-sectional side view of the illumination device's removed housing cap.

FIG. 8 illustrates a close-up cross-sectional side view of the illumination device's removed housing cap. The housing cap 830 further comprises a pressable center portion 821, protrusion 822, and interior threading 875. Screwing the housing cap 830 onto the corresponding threaded top portion of the cone creates an effective seal that protects the batteries and electronic components from moisture, dirt, sand, debris, and other harmful elements. The protrusion 822 extends the vertical reach of the pressable center portion 821, and makes contact with the battery housing when receiving downward pressure. This activates various lighting operation sequences via the circuit board and connected LED module.

Figure 9:
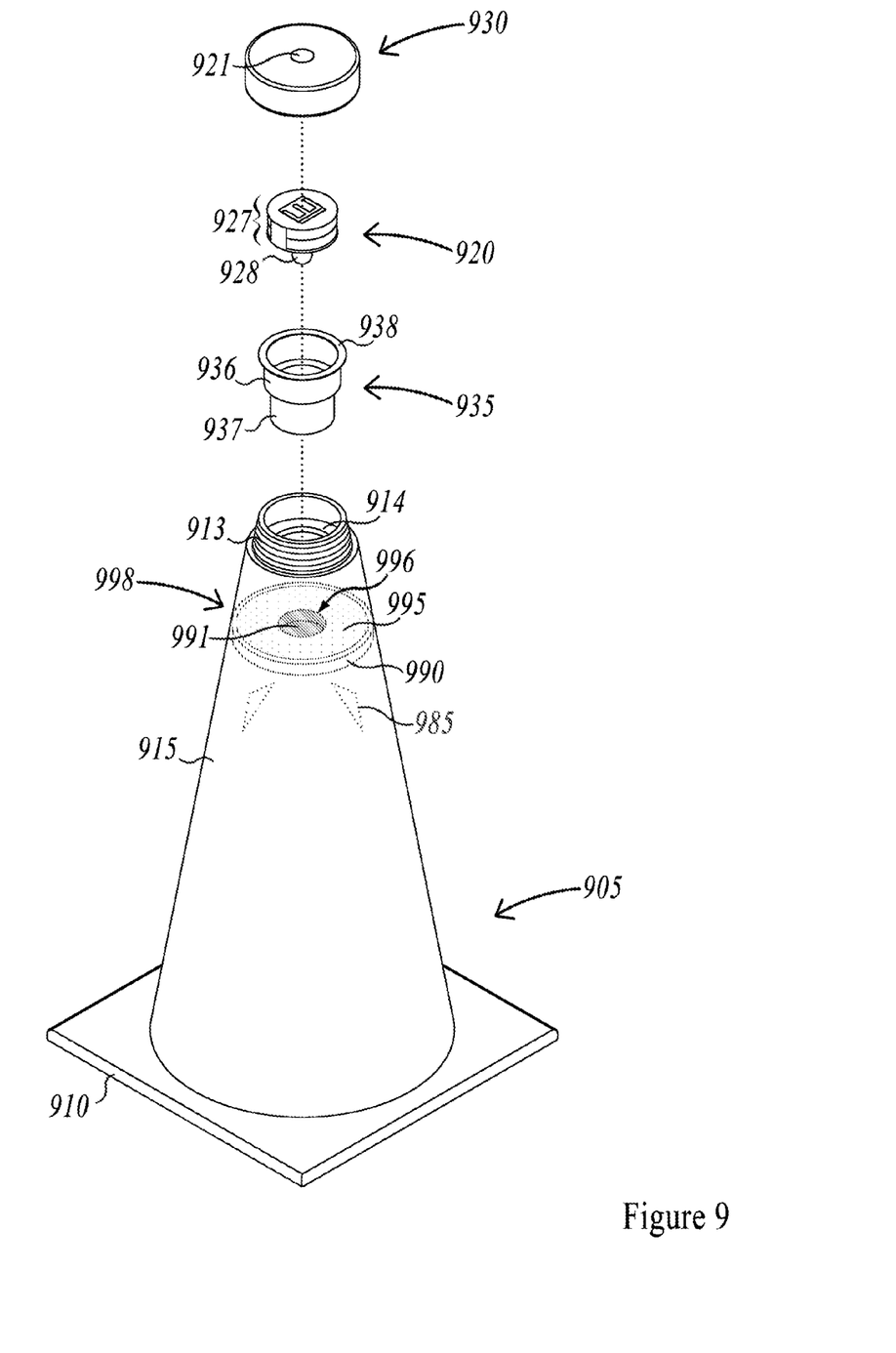
FIG. 9 illustrates an isometric exploded view of an alternate embodiment of the illuminated cone with reflective platform for optimal light transmission and protection.
Figure 10:
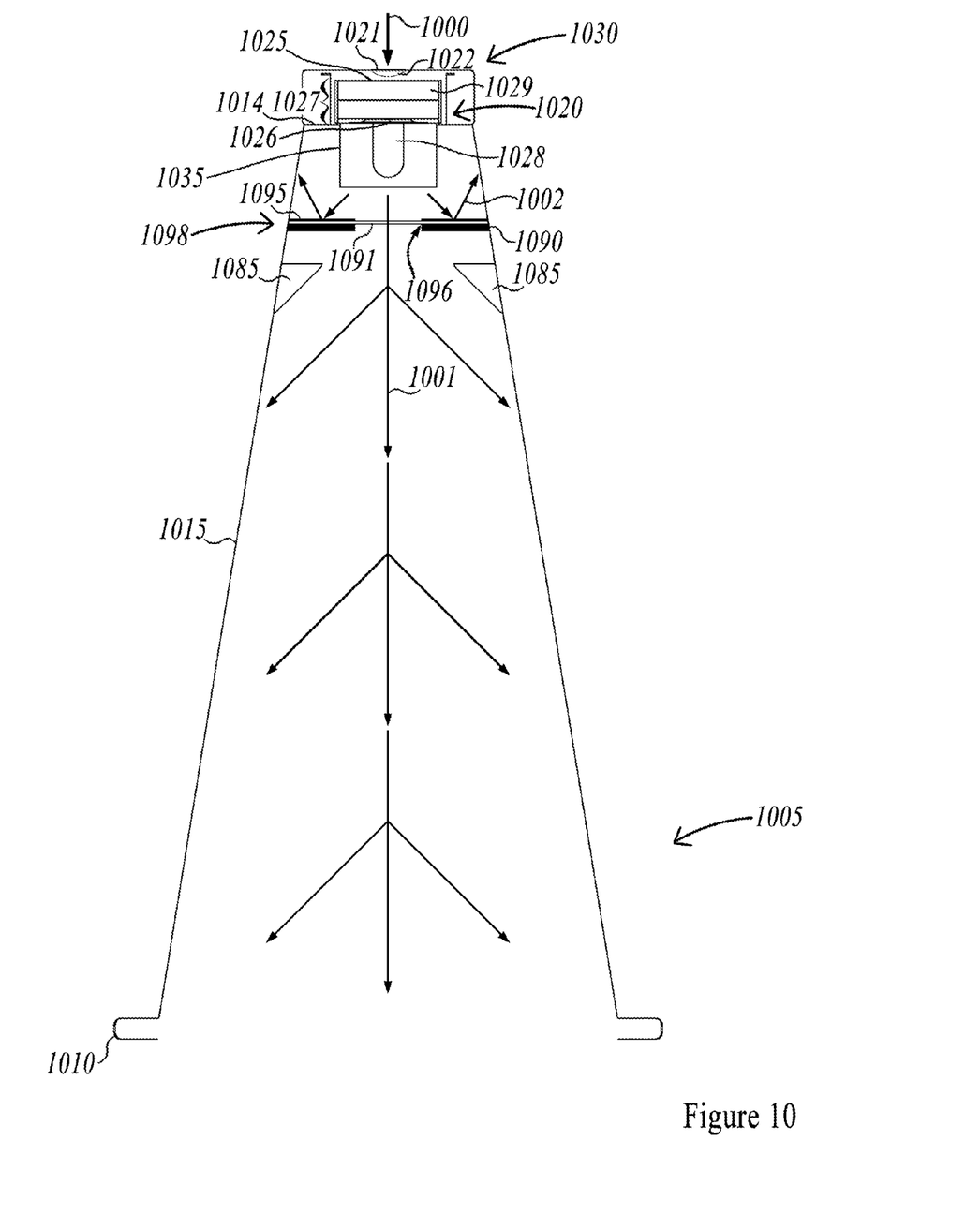
FIG. 10 illustrates a cross-sectional side view of an alternate embodiment of the illuminated cone with reflective platform for optimal light transmission and protection.
Figure 11:
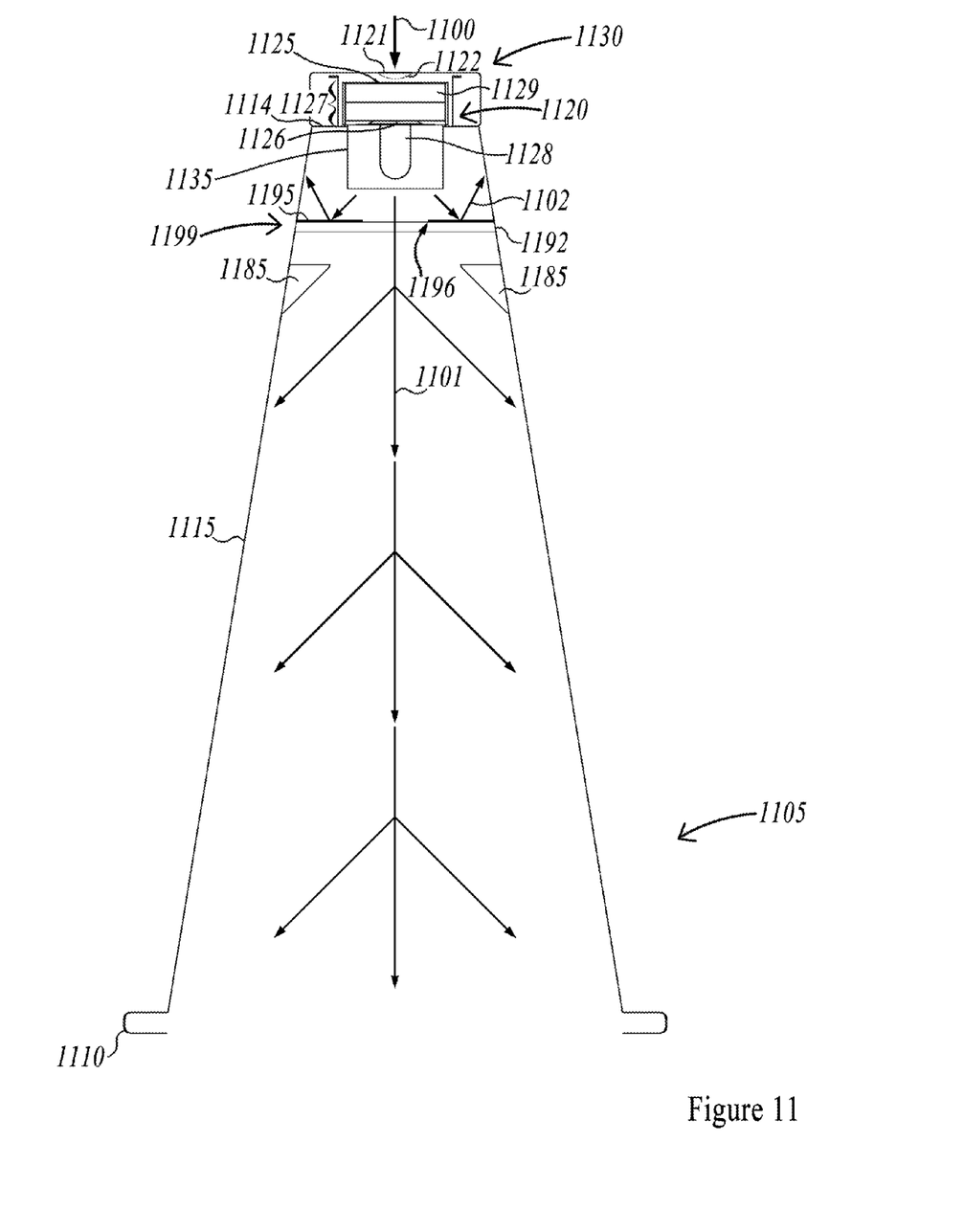
FIG. 11 illustrates a cross-sectional side view of a second alternate embodiment of the illuminated cone having a modified reflective platform.

FIGS. 9-11 illustrate alternate embodiments of the safety cone with controlled illumination, both having a circular reflective platform beneath the illumination device and above the ridges. The addition of this reflective platform, in either embodiment, augments brightness in the top portion of the cone, while still providing full illumination of the entire cone body.

FIG. 9 illustrates an isometric exploded view of an alternate embodiment of the illuminated cone having a reflective platform below the illumination device that enhances light distribution and protects the illumination device from contaminants and physical damage. The illuminated cone comprises a modified self-standing cone 905, transparent shell 935, illumination device 920 and housing cap 930. The modified self-standing cone 905 comprises a base portion 910, cone portion 915, threaded top portion 913, extended support ring 914, ridges 985, and reflective platform 998. The reflective platform 998 (shown with dotted lines) is ring-shaped and extends circumferentially inward from an interior surface of the cone portion 915. The reflective platform 998 serves the dual purpose of providing enhanced illumination at the top of the cone while allow light to pass to the bottom of the cone and further protecting the illumination device 920 from contaminants (dirt, water) as well as physical damage. Reflective platform 998 lies above the ridges 985 and below extended support ring 914, and further comprises a ring 990, transparent film 991 and reflective film 995. The reflective film 995 is positioned on the top (i.e. upper) surface of the ring 990. The transparent film 991 can be positioned immediately above the ring 990, immediately above the reflective film 995, or on the bottom surface (underside) of the ring 990.

As shown, ring 990 is in the shape of an annulus or ring, with an opening 996 at its center. While the opening is shown as being circular in this embodiment, other shapes or patterns may be utilized. Transparent film 991 covers the opening 996, thereby sealing off the illumination device 920 while allowing light emitted from the illumination device 920 to pass through the ring 990 and into the lower cone portion 915. Thus, the opening 996 allows light emitted from the LED light 928 of illumination device 920 to pass through to the lower portions of the cone portion 915. Reflective film 995 provides a reflective surface against which light is reflected upward and outward, thereby increasing the level or intensity of illumination in the portion of the cone above the reflective platform 998. Thus, this configuration increases the illumination level in the top region of the cone without additional electronics, allows light to pass to the rest of the cone 915 via opening 996, while simultaneously protecting the illumination device 920 from contaminants (e.g. dirt, debris, moisture) or physical impact that may be introduced from the bottom of the cone. The reflective film 995 can be an integrated coating or a tape or film that is applied directly to the surface of the ring 990, or the surface of transparent film 991, depending on the positioning order. Alternatively, the transparent film 991 and the reflective film 995 can comprise a single film having a reflective annular portion and a circular transparent film at its center. While the transparent film portion is shown as being circular in this embodiment, other shapes or patterns may be utilized.

Placed directly into the cone's threaded top portion 913, the transparent shell 935 comprises a rim portion 938, upper tier 936 and lower tier 937. It fits snugly within the cone, snapping or maintaining its position via substantial friction. The transparent shell 935 is configured to receive and house the illumination device 920, including battery housing 927 and LED module 928. The transparency of the transparent shell 935 allows for the passage of light emitted from the LED module 928. The housing cap 930, with pressable center portion 921, is twisted onto the cone's threaded top portion 913. Thus, as described, the present invention provides a safety cone with an integrated, controllable illumination and where the illumination device is contained within the cone and does not affect the outer shape or usage of the cone. The illumination device is easily accessible by removal of the housing cap 930, such that the batteries can be replaced as needed and other components can be accessed if desired. Further, the reflective platform allows for additional control of the illumination pattern and intensity, while simultaneously providing additional protection from contaminants and objects that could harm the illumination device by sealing off the illumination housing from the bottom.

FIG. 10 illustrates an assembled, cross-sectional side view of the illuminated cone of FIG. 9 comprising a modified self-standing cone 1005, an illumination device 1020, a transparent shell 1035, and a housing cap 1030. The modified self-standing cone 1005, with base portion 1010, cone portion 1015, ridges 1085, and reflective platform 1098, securely houses the illumination device 1020 and transparent shell 1035. The reflective platform 1098 further comprises a ring 1090, transparent film 1091, and reflective film 1095. Light emitted from the LED module 1028 can pass through the transparent film 1091 that covers opening 1096 and emanates throughout the lower cone portion 1015. This transmission of light is shown with motion arrows 1001. In contrast, a portion of the light emitted from the LED module 1028 meets the reflective ring 1095, and is reflected back upward toward the upper region of the cone between the housing cap 1030 and the ring 1090. Thus, the intensity of the light or illumination is increased above the ring 1090. This movement of light is shown with motion arrows 1002.

The transparent shell 1035 is made of a thin, clear plastic and is shaped to house the illumination device and keep it in place within the illumination housing within the top of the cone. The transparent shell 1035 protects the illumination device from moisture, contaminants, and physical damage without diminishing the transmission of light from the LED module 1028. The illumination device 1020 comprises a battery housing 1027 and LED module 1028. The illumination device 1020 rests on the support ring 1014, which acts as a platform to secure the illumination device and provides an opening for the LED module 1028 to extend downward. The battery housing 1027 further comprises a protrusion contact plate 1025, an LED control contact 1026, and one or more removable batteries 1029. The removable batteries 1029 may be chemical cell batteries as are conventionally used in small electronic devices. Compressing these three components together in succession activates the LED light within the module 1028. In this figure, the housing cap 1030 is twisted onto the cone portion 1015, thereby sealing interior components. At the center of the housing cap 1030 is a pressable center portion 1021. Applying pressure to center portion 1021 in the direction of the cone causes the depression of the center portion and the underlying protrusion 1022 on the housing cap 1030. This action activates and deactivates the operation of the LED within the LED module 1028 of the illumination device 1020.

In order to activate the illumination device 1020, a user exerts a downward force upon the pressable center portion 1021 of the housing cap 1030, indicated by motion arrow 1000. This physically compresses the protrusion contact plate 1025 onto the batteries 1029. This in turn depresses the LED control contact 1026 which is attached to the top surface of the LED circuit board (see LED circuit board 624 of FIG. 6), transmitting a signal directly to the LED module 1028, including the activation state (i.e., ON/OFF) and lighting duration/timing. Depending on the operation sequence, this pressing of the pressable center portion 1021 will turn on the LED, switch to a blinking LED state, or turn off the LED. These and other parameters are controlled by the program set by the LED circuit board, subject to the manual activation/deactivation of the lighting by pressing the housing cap. As shown, ridges 1085 extend from the inner surface of the cone body below the support ring 1014. The ridges 1085 could be a continuous element or a plurality of discrete elements extending from the inner surface of the cone. The ridges 1085 prevent unwanted activation of the LED module by depression of the housing cap 1030 when additional cones are stacked on top of the cone.

FIG. 11 illustrates a cross-sectional side view of a second alternate embodiment of the illuminated cone having a modified reflective platform. The illuminated cone comprises a modified self-standing cone 1105, an illumination device 1120, a transparent shell 1135, and a housing cap 1130. The modified self-standing cone 1105, with base portion 1110, cone portion 1115, ridges 1185, and reflective platform 1199, securely houses the illumination device 1120 and transparent shell 1135. The reflective platform 1199 is a transparent, circular platform that has no physical opening. Whereas the embodiment of FIG. 9 had a physical opening (i.e. opening 996) to allow light to pass through, this embodiment utilizes a transparent platform 1192, such that light will pass through the portion of the transparent platform 1192 that is not covered by the reflective film 1195, i.e. opening 1196. While this embodiment requires a transparent platform material, which may be a different material from that of the rest of the cone, it has the advantage of not requiring a transparent film (e.g. transparent film 991 and 1091 of FIGS. 9 and 10, respectively) and also providing a solid barrier that completely seals off the illumination device 1120 and associated components from the open (base) end of the cone through with contaminants (e.g. direct, debris, water) can enter and thereby damage the illumination unit 1120. As shown, the reflective film 1195 takes on a ring or annulus shape to expose a circular area in the center of the transparent platform 1192 through which light can pass to the lower cone portion 1115. Thus, light emitted from the LED module 1128 can pass through the transparent platform 1192 and emanate throughout the lower cone portion 1115. This movement of light is shown with motion arrows 1101. In contrast, a portion of the light emitted from the LED module 1128 meets the reflective film 1195, subsequently getting deflected and moving back upward toward the interior top region of the cone. Although the embodiment shown in FIG. 11 displays an opening 1196 in the reflective film 1195 that is confined to the center of the reflective platform 1199 and surrounded by an annulus of reflective film 1195, the opening 1196 and reflective film 1195 take on any shape or pattern relative to one another.

The transparent shell 1135 is made of a thin, clear plastic and is shaped to house the illumination device and keep it in place within the illumination housing within the top of the cone. The transparent shell 1135 protects the illumination device from moisture, contaminants, and physical damage without diminishing the light from the LED module 1128. The illumination device 1120 comprises a battery housing 1127 and LED module 1128. The illumination device 1120 rests on the support ring 1114, which acts as a platform to secure the illumination device and provides an opening for the LED module 1128 to extend downward. The battery housing 1127 further comprises a protrusion contact plate 1125, an LED control contact 1126, and one or more removable batteries 1129. The removable batteries 1129 may be chemical cell batteries as are conventionally used in small electronic devices. Compressing these three components together in succession activates the LED light within the module 1128. In this figure, the housing cap 1130 is twisted onto the cone portion 1115, thereby sealing interior components. At the center of the housing cap 1130 is a pressable center portion 1121. Applying pressure to center portion 1121 in the direction of the cone causes the depression of the center portion and the underlying protrusion 1122 on the housing cap 1130. This action activates and deactivates the operation of the LED within the LED module 1128 of the illumination device 1120.

In order to activate the illumination device 1120, a user exerts a downward force upon the pressable center portion 1121 of the housing cap 1130, indicated by motion arrow 1100. This physically compresses the protrusion contact plate 1125 onto the batteries 1129. This in turn depresses the LED control contact 1126 which is attached to the top surface of the LED circuit board (see LED circuit board 624 of FIG. 6), transmitting a signal directly to the LED module 1128, including the activation state (i.e., ON/OFF) and lighting duration/timing. Depending on the operation sequence, this pressing of the pressable center portion 1121 will turn on the LED, switch to a blinking LED state, or turn off the LED. These and other parameters are controlled by the program set by the LED circuit board, subject to the manual activation/deactivation of the lighting by pressing the housing cap. As shown, ridges 1185 extend from the inner surface of the cone body below the support ring 1114. The ridges 1185 could be a continuous element or a plurality of discrete elements extending from the inner surface of the cone. The ridges 1185 prevent unwanted activation of the LED module by depression of the housing cap 1130 when additional cones are stacked on top of the cone.

While there have been described herein what are considered to be preferred and exemplary embodiments of the present invention, other modifications of the invention shall be apparent to those skilled in the art from the teachings herein. It is noted that the embodiments disclosed are illustrative rather than limiting in nature and that a wide range of variations, modifications, changes, substitutions are contemplated in the foregoing disclosure and, in some instances, some features of the present invention may be employed without a corresponding use of other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. A safety cone with controlled illumination comprising:
   a base configured to support the cone, the base having a bottom surface and a top surface;
   a light-transmitting, cone-shaped body having a bottom portion, a top portion, an inner surface, and an outer surface, wherein the bottom portion is connected to the base;
   an illumination housing integrated into the top portion of the body, the illumination housing further comprising a support ring extending from the inner surface of the body, an illumination device, and a housing cap that provides access to the illumination device;
   one or more ridges extending from the inner surface of the body below the support ring;
   wherein the illumination device further comprises a light-emitting diode (LED) module that provides illumination, one or more removable batteries, a battery housing configured to house and provide electrical contact to the one or more batteries, a circuit board and an illumination actuator;
   a transparent shell configured to house and protect the illumination device;
   wherein a bottom surface of the housing cap has a protrusion in a center portion such that depression of the housing cap causes contact with the illumination actuator and thereby controls the LED module; and
   wherein the one or more ridges prevent unwanted activation of the LED module by depression of the housing cap when additional cones are stacked on top of the cone.

2. The safety cone of claim 1 wherein the LED module extends downward through the support ring and towards the base.

3. The safety cone of claim 1 wherein the housing cap and top portion of the illumination housing have complimentary threading that allow the housing cap to be screwed on to, and off of, the illumination housing.

4. The safety cone of claim 1 wherein pressing the center of the housing cap affects operation of the illumination device via contact of the housing cap's protrusion with the illumination actuator, such that pressing the center of the housing cap switches the LED module between an ON state and an OFF state.

5. The safety cone of claim 1 wherein the circuit board is programmed with one or more lighting operations that determine the activation, duration, sequence and/or color of the illumination.

6. The safety cone of claim 1 wherein starting in an OFF state and pressing the housing cap three times successively will result in the following operational sequence, respectively: LED ON, BLINKING LED, LED OFF.

7. The safety cone of claim 1 wherein starting in an OFF state and pressing the housing cap three times successively will result in the following operational sequence, respectively: LED ON, BLINKING LED, LED OFF.

8. The safety cone of claim 1 wherein the LED module contains an RGB LED capable of producing a plurality of colors.

9. The safety cone of claim 1 wherein pressing the housing cap once initiates a lighting operation in which the LED module emits different colored lights in a sequence and duration determined by the circuit board.

10. The safety cone of claim 1 wherein pressing the housing cap once causes the LEDs in the LED module to cycle through the following operation sequence: red LED ON, green LED ON, blue LED ON, LED OFF.

11. The safety cone of claim 1 wherein successively pressing the housing cap causes the LEDs in the LED module to cycle through the following operation sequence: red LED ON, green LED ON, blue LED ON, LED OFF.

12. A safety cone with controlled illumination comprising:
- a base configured to support the cone, the base having a bottom surface and a top surface;
- a light-transmitting, cone-shaped body having a bottom portion, a top portion, an inner surface, and an outer surface, wherein the bottom portion is connected to the base;
- an illumination housing integrated into the top portion of the body, the illumination housing further comprising a support ring extending from the inner surface of the body, an illumination device, and a housing cap that provides access to the illumination device;
- one or more ridges extending from the inner surface of the body below the support ring;
- wherein the illumination device further comprises a light-emitting diode (LED) module that provides illumination, one or more removable batteries, a battery housing configured to house and provide electrical contact to the one or more batteries, a circuit board and an illumination actuator;
- a transparent shell configured to house and protect the illumination device;
- a reflective platform connected with the inner surface of the body and positioned above the one or more ridges, said reflective platform comprising an annular platform having an opening, a reflective film covering the annular platform, and a transparent film covering the opening;
- wherein a portion of the light transmitted from the light-emitting diode (LED) module is reflected from the surface of the reflective film towards the top portion of the cone and a portion of the light transmitted from the light-emitting diode (LED) module passes through the opening via the transparent film towards the bottom portion of the cone;
- wherein a bottom surface of the housing cap has a protrusion in a center portion such that depression of the housing cap causes contact with the illumination actuator and thereby controls the LED module; and
- wherein the one or more ridges prevent unwanted activation of the LED module by depression of the housing cap when additional cones are stacked on top of the cone.

13. The safety cone of claim 12 wherein the LED module extends downward through the support ring and towards the base.

14. The safety cone of claim 12 wherein the housing cap and top portion of the illumination housing have complimentary threading that allow the housing cap to be screwed on to, and off of, the illumination housing.

15. The safety cone of claim 12 wherein pressing the center of the housing cap affects operation of the illumination device via contact of the housing cap's protrusion with the illumination actuator, such that pressing the center of the housing cap switches the LED module between an ON state and an OFF state.

16. A safety cone with controlled illumination comprising:
- a base configured to support the cone, the base having a bottom surface and a top surface;
- a light-transmitting, cone-shaped body having a bottom portion, a top portion, an inner surface, and an outer surface, wherein the bottom portion is connected to the base;
- an illumination housing integrated into the top portion of the body, the illumination housing further comprising a support ring extending from the inner surface of the body, an illumination device, and a housing cap that provides access to the illumination device;
- one or more ridges extending from the inner surface of the body below the support ring;
- wherein the illumination device further comprises a light-emitting diode (LED) module that provides illumination, one or more removable batteries, a battery housing configured to house and provide electrical contact to the one or more batteries, a circuit board and an illumination actuator;
- a transparent shell configured to house and protect the illumination device;
- a reflective platform connected with the inner surface of the body and positioned above the one or more ridges, said reflective platform comprising a transparent circular platform and a reflective film positioned over the transparent circular platform, wherein the reflective film has one or more openings through which light can pass;
- wherein a portion of the light transmitted from the light-emitting diode (LED) module is reflected from the surface of the reflective film towards the top portion of the cone and a portion of the light transmitted from the light-emitting diode (LED) module passes through the opening via the transparent film towards the bottom portion of the cone;
- wherein a bottom surface of the housing cap has a protrusion in a center portion such that depression of the housing cap causes contact with the illumination actuator and thereby controls the LED module; and
- wherein the one or more ridges prevent unwanted activation of the LED module by depression of the housing cap when additional cones are stacked on top of the cone.

17. The safety cone of claim 16 wherein the LED module extends downward through the support ring and towards the base.

18. The safety cone of claim 16 wherein the housing cap and top portion of the illumination housing have complimentary threading that allow the housing cap to be screwed on to, and off of, the illumination housing.

19. The safety cone of claim 16 wherein pressing the center of the housing cap affects operation of the illumination device via contact of the housing cap's protrusion with the illumination actuator, such that pressing the center of the housing cap switches the LED module between an ON state and an OFF state.

* * * * *